March 22, 1960 J. H. PASELL 2,929,172
MACHINE FOR CUTTING A SUCCESSION OF
WORKPIECES TO A PREDETERMINED SIZE
Filed July 16, 1956 6 Sheets-Sheet 1

INVENTOR
JOSEPH H. PASELL
BY Tellert McCormick
ATTORNEYS

FIG. 5

INVENTOR
JOSEPH H. PASELL
BY Teller + McCormick
ATTORNEYS

March 22, 1960

J. H. PASELL

2,929,172

MACHINE FOR CUTTING A SUCCESSION OF
WORKPIECES TO A PREDETERMINED SIZE

Filed July 16, 1956

INVENTOR
JOSEPH H. PASELL
BY Teller & McCormick
ATTORNEYS

FIG. 13

INVENTOR
JOSEPH H. PASELL
BY Teller & McCormick
ATTORNEYS

United States Patent Office 2,929,172
Patented Mar. 22, 1960

2,929,172

MACHINE FOR CUTTING A SUCCESSION OF WORKPIECES TO A PREDETERMINED SIZE

Joseph H. Pasell, Dartmouth, Mass., assignor, by mesne assignments, to Van Norman Industries, Inc., Springfield, Mass., a corporation of Massachusetts Application July 16, 1956, Serial No. 597,912

25 Claims. (Cl. 51—95)

This application is a continuation-in-part of my copending application Serial No. 494,608, filed March 16, 1955, and entitled Grinding Apparatus, which application has been abandoned.

The invention relates to a machine for cutting a succession of similar workpieces to a predetermined size by a rotatable tool having a cutting face which is engageable with said workpieces and which is subject to changes in position as the result of wheel dressing. The successive workpieces are preferably, but not necessarily, rotatable about a longitudinal axis. Although the invention is not necessarily so limited, the cutting tool may advantageously be a grinding wheel rotatable about a generally longitudinal axis. During each cycle, the cutting tool or grinding wheel is fed forwardly toward the workpiece to cut or grind it until the required size or diameter is obtained and said tool or wheel is then moved rearwardly to a normally fixed rearward position.

The general object of the invention is to provide a machine of the type specified provided with a means for limiting the forward feeding movement of the tool or wheel and provided with a member which controls said feed limiting means and which is movable relatively to the cutting tool or wheel and the support therefor to compensate for changes in the position of the cutting face of the tool or wheel as the result of wheel dressing.

Further objects of the invention are to provide various advantageous mechanical and electrical features which cooperate for the attainment of the said more general object.

Other objects of the invention will be apparent from the drawings and from the following description and claims.

The drawings show a preferred embodiment of the invention, but it will be understood that various changes may be made from the construction shown, and that the drawings are not to be construed as defining or limiting the scope of the invention, the claims forming a part of this specification being relied upon for that purpose.

*General organization*

Figure 1:
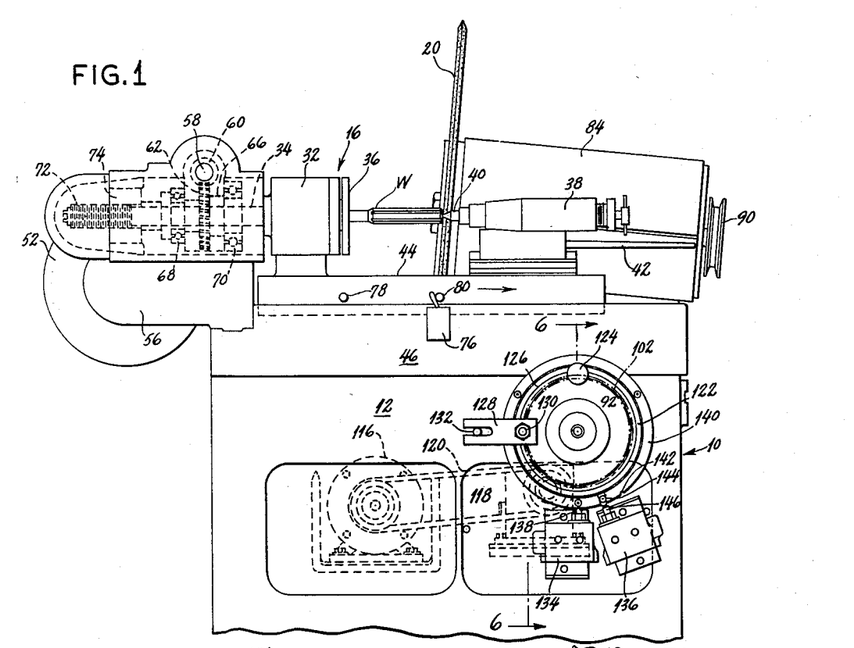
Fig. 1 is a front view of a machine embodying the invention, certain parts in the rear portion of the machine being omitted.
Figure 4:
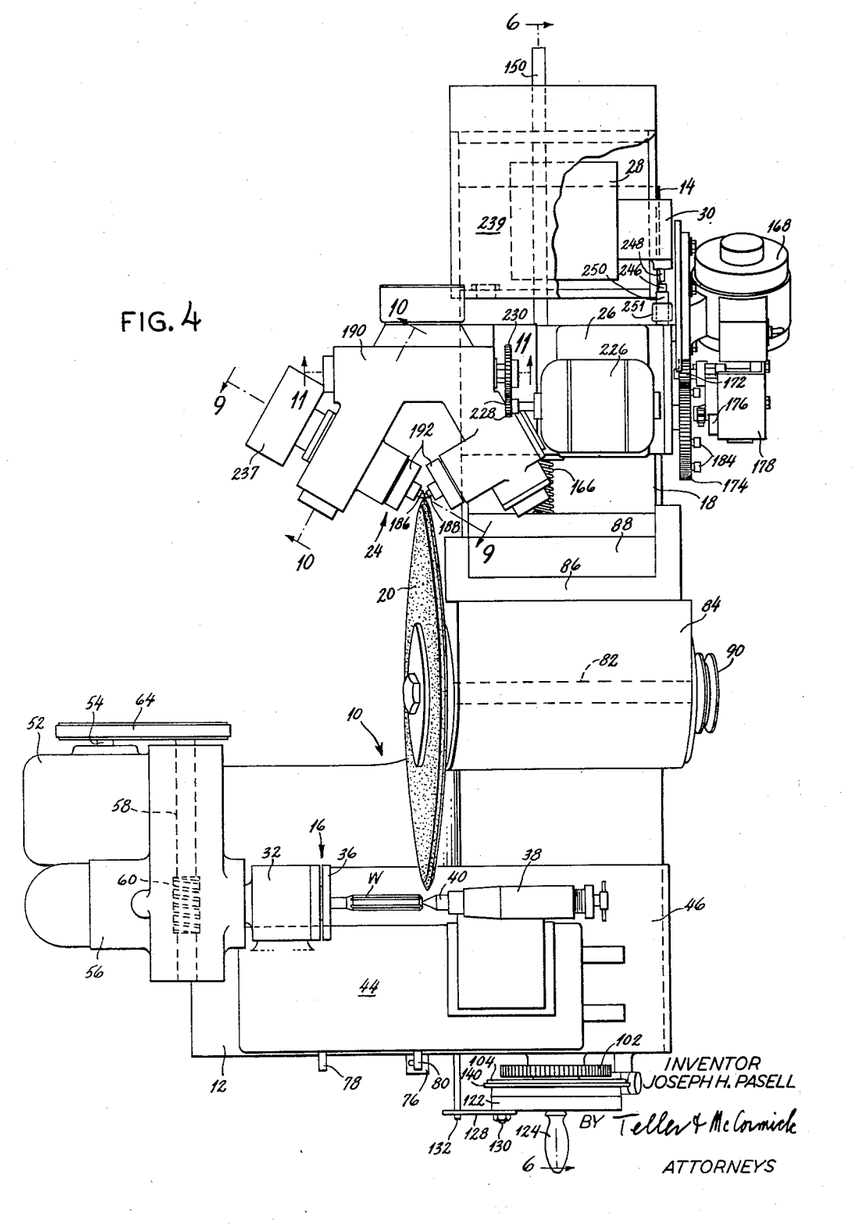
Fig. 4 is a plan view of the machine.
Figure 5:
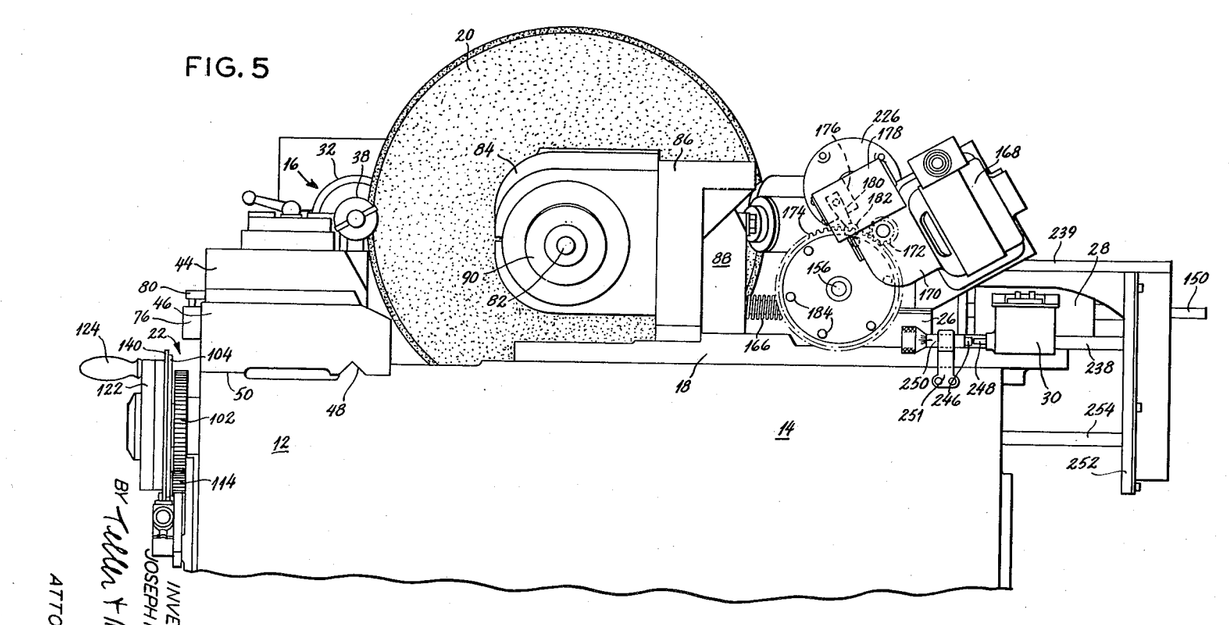
Fig. 5 is a right side view of the machine.

Referring more particularly to Figs. 1, 4 and 5, the machine comprises a main base 10 having a longitudinally extending front portion 12 and a transversely extending rear portion 14. Mounted on the front portion 12 of the base is a holder or mechanism for holding a workpiece to be ground, this holder or mechanism being indicated generally by 16.

Mounted on the transversely extending rear portion of the base is a support or slide 18. The support or slide 18 carries a rotatable cutting tool 20 engageable with a workpiece held by the workpiece holder 16. The cutting tool is preferably rotatable about a generally longitudinal axis, and it is shown as being a grinding wheel.

Suitable operating mechanism generally indicated at 22 is provided for moving the tool support 18 and the cutting tool or wheel 20 forwardly so as to feed the tool or wheel to a forward cutting position and for subsequently moving said support and said tool or wheel rearwardly out of said cutting position.

A device generally indicated at 24 is provided for engaging the cutting face of the tool, and when the cutting tool is a grinding wheel as shown, said device 24 is a wheel dressing device. The device 24, when it is a wheel dressing device, is adjustable toward the wheel in order to effect dressing, and as shown it is mounted at the rear of the wheel and is movable forwardly relatively to the wheel. Preferably and as shown in Fig. 4, the device 24 is carried by a slide 26 on the tool support or slide 18 and is movable transversely therealong.

A compensation member 28 is provided which is normally movable in unison with said tool support or slide 18 but which is adjustable transversely relatively thereto and also relatively to said operating mechanism 22, said compensation member being adjusted in a predetermined relationship to the movement of the wheel dressing device as hereinafter more fully described. A feed limiting means is provided for interrupting the action of the operating means 22 so that the cutting tool cuts the corresponding workpiece to a predetermined size or diameter. This feed limiting means includes a device generally indicated at 30 and preferably carried by the compensation member 28, and said feed limiting means serves to limit forward feeding movement with the compensation member always in an exactly predetermined position.

*Workpiece holding means*

Referring particularly to Figs. 1, 4 and 5, the workpiece holding means 16 may be widely varied within the scope of the broader aspects of the invention, but said means is preferably constructed and arranged for holding a rotatable workpiece such as W and for rotating said workpiece about a fixed longitudinal axis. As shown, there is a headstock 32 having a rotatable power operated spindle 34 which carries a collet or chuck 36 for gripping the workpiece adjacent one end thereof. There is also provided a tailstock 38 having a center 40 engageable with the usual center in the opposite end of the workpiece. The tailstock 38 is or may be of conventional construction and includes means such as a lever 42 for retracting the center 40 to permit one workpiece to be removed and another workpiece to be put in place.

The present invention is particularly applicable to a machine wherein there is relative longitudinal reciprocation between the workpiece W and the cutter and the machine is shown as having provision for such reciprocation. It is preferred to reciprocate the workpiece rather than the cutter, and as shown the headstock 32 and the tailstock 38 are carried by a common slide or table 44 guided for longitudinal movement in suitable guideways, not shown, on a member 46 mounted on the base portion 12. The member 46 may be a slide longitudinally adjustable relatively to the base on guideways 48 and 50, but such adjustment constitutes no part of the present invention. A suitable means hereinafter more fully described is provided for effecting the reciprocation of the slide or table 44.

The machine as illustrated is adapted for grinding threads in a blank to form a tap, the tap blank in this instance constituting the workpiece W. Said workpiece is shown as having longitudinal flutes therein which are characteristic of a tap blank. In order that threads may be ground, the reciprocation of the slide or table 44 and the parts carried thereby must be in synchronism with the rotation of the workpiece, the timing being that necessary for the required threads. The mechanism for providing synchronized rotation and reciprocation is or may be of conventional form and the drawings show an example of such a mechanism.

For rotating the spindle 34 and the workpiece and for effecting the necessary reciprocation, an electric motor 52 having a transverse shaft 54 is carried by a bracket 56 on the slide 46. Rotatably mounted in the upper portion of the bracket 56 is a transverse shaft 58 carrying a worm 60 meshing with a worm wheel 62 concentric with the spindle 34. An endless belt 64 extends around pulleys on the shafts 54 and 58, thus enabling the motor 52 to rotate the shaft 58 and the spindle 34. The worm wheel 62 is not rigidly secured to the spindle 34, but is carried by a sleeve 66 surrounding the spindle 34 and held in bearings 68 and 70. The sleeve 66 is splined to the spindle 34 so that the sleeve and the spindle rotate in unison, but the spindle is free to move longitudinally relatively to the sleeve. As the result of different pulley diameters there is a speed reduction from the motor shaft 54 to the shaft 58, and as the result of the worm and the worm wheel there is an additional speed reduction from the shaft 58 to the spindle 34. If further speed reduction is required, this may be provided in any usual or suitable manner. Secured to the spindle 34 in fixed relationship thereto is a threaded member 72 entered in and engaged with a nonrotatable nut fixedly secured in the bracket 56. The pitch of the threads on the member 72 and in the nut 74 is the same as the pitch of the threads to be ground in the blank W.

By means of suitable electrical connections to be described, the motor 52 is operated first in one direction and then in the opposite direction and, as the motor is so turned, the spindle 34 and the workpiece W are similarly rotated first in one direction and then in the opposite direction. Assuming that right-hand threads are to be cut in the blank or workpiece W, the member 72 and the nut 74 are provided with similar right-hand threads and rotation of said member 72 is initially effected in the clockwise direction as viewed from the left. The engagement of the member 72 with the nut 74 causes the spindle 34 and the parts connected therewith, including the workpiece, to be moved toward the right, as indicated by the arrow in Fig. 1, and as the workpiece so moves a cutting tool such as the grinding wheel 20 cuts threads therein. After movement toward the right to a predetermined extent, the motor 52 is reversed. This reverses the direction of workpiece rotation and also the direction of longitudinal movement and the parts are returned to the starting position shown in Figs. 1 and 2.

For reversing the motor 52 there is provided a switch 76 having a switch arm biased to either of two closed positions and operable by pins 78 and 80 on the slide 44. The switch is shown with its arm in the left position after having been engaged by the right pin 80 at the end of movement of the slide or table 44 toward the left. The operation of the switch 76 will be more fully described in conjunction with the wiring diagram in Fig. 13.

*Cutting tool and support therefor*

Although the invention is not necessarily so limited, the cutting tool 20, as previously stated, is shown as being a grinding wheel, and said wheel is preferably rotatable about a generally longitudinal axis. Preferably, the wheel is behind the position of the workpiece and the axis of the wheel is approximately at the level of the workpiece axis. The cutting tool or grinding wheel is carried by a transversely movable support on the base and preferably said support is a slide such as the beforementioned slide 18. The slide is guided for forward and rearward movement on the rear portion 14 of the base by means of suitable guideways not shown in detail. The grinding wheel is carried by a rotatable spindle 82 mounted in suitable bearings, not shown, in a bracket 84 carried by a plate 86 which in turn is carried by an upward projection 88 on said slide 18. The spindle 82 and the grinding wheel 20 may be driven in any suitable manner, and as shown a belt pulley 90 is secured to the spindle 82 and a belt, not shown, extends around said pulley and around another pulley on the shaft of a suitable motor, not shown.

When the machine is particularly adapted and intended for grinding threads on tap blanks, the bracket 84 is preferably adjustable about a transverse horizontal axis so that the grinding wheel 20 may be placed at an angle conforming to or approximately conforming to the pitch angle of the threads to be ground. To this end the bracket 84 is angularly adjustable relatively to the plate 86. The means for adjusting the bracket and for holding it in adjusted position do not constitute any part of the present invention and they are omitted from the drawings.

*Operating mechanism for cutting tool support*

Figures 6, 7:
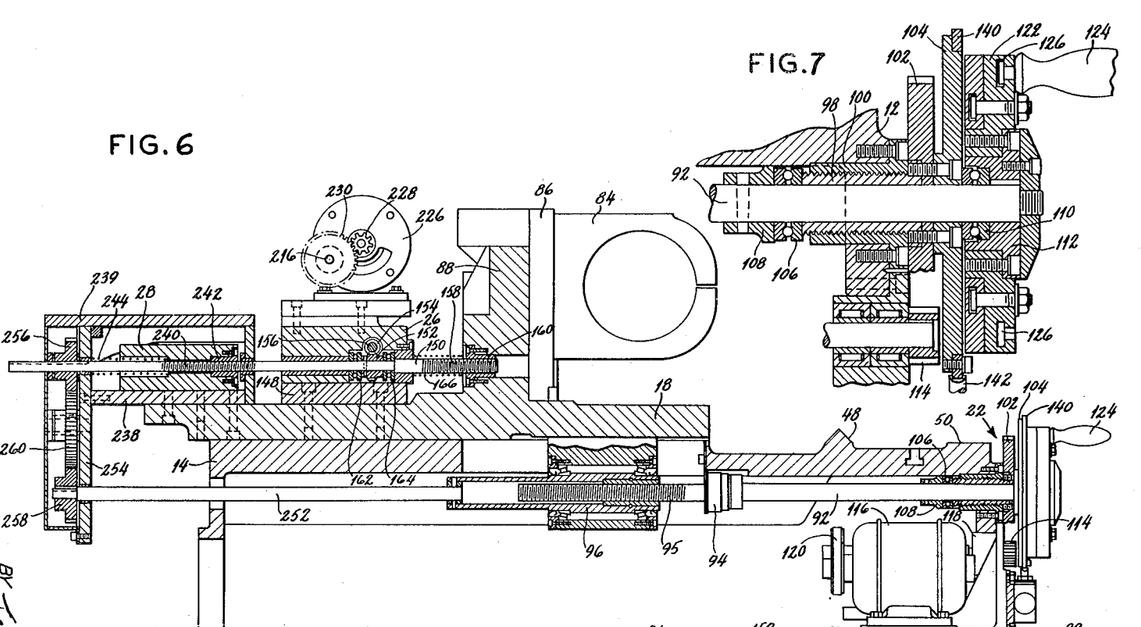
Fig. 6 is a transverse vertical sectional view taken along the lines 6—6 of Figs. 1 and 4 but with certain parts omitted and with certain other parts shown in front of the section lines as hereinafter explained.
Fig. 7 is an enlarged fragmentary sectional view of certain parts shown in the right hand portion of Fig. 6.

It is necessary for the cutting tool support or slide 18 to be moved forwardly so that the cutting tool may engage the workpiece and it is necessary for the said support or slide to be thereafter moved rearwardly to move the cutting tool out of cutting position. For so moving the tool support or slide and the cutter there is provided the beforementioned operating mechanism 22. The said mechanism includes a transversely extending shaft or control member 92 which is best shown in Figs. 6 and 7 and which is bodily movable transversely of the machine or lengthwise of the shaft. Said shaft is connected at the rear portion thereof with said slide 18 and as shown the shaft is guided in a bearing 94. Preferably the rear portion of the shaft 92 is threaded at 95 and is in engagement with a nut 96 connected with the slide 18, said nut being fixed against transverse movement relatively to the slide. Said shaft 92 is normally nonrotatable, but it may be rotated for purposes of adjustment and set-up as hereinafter explained. When the shaft is so rotated, it rotates relatively to the nut 96 and the slide 18 and the cutting tool are adjusted forwardly or rearwardly relatively to the shaft and relatively to other parts of the operating mechanism.

Surrounding and fitting the shaft 92 near the front thereof is an exteriorly threaded sleeve 98 which has threaded engagement with a nut 100 fixedly secured to the front portion 12 of the base. Rotatably connected with the sleeve 98 is a gear 102 and a cam disc 104. The gear 102 may be rotated as hereinafter explained, and when it is so rotated the sleeve 98, because of its threaded engagement with the nut 100, is moved forwardly or rearwardly according to the direction of rotation. A ball bearing 106 at the rear of the sleeve engages a collar 108 secured to the shaft 92. A ball bearing 110 at the front of the cam disc 104 engages a hub 112 secured to the shaft. Said ball bearings 106 and 110 serve to cause the shaft 92 to be moved forwardly or rearwardly as the sleeve 98 is turned and is thereby moved forwardly or rearwardly.

The gear 102 meshes with a pinion 114 which is driven by a reversible motor 116. Electrically controlled means are provided for starting and stopping the rotation of said pinion by said motor, and as illustrated such means serve to start and stop the motor as hereinafter more fully explained. The motor 116 is equipped with an automatic brake which serves to stop motor rotation practically instantaneously when the motor current is interrupted. Motors so equipped with brakes are well-known and no detailed description is necessary.

As shown, the pinion 114 is on a shaft projecting forwardly from a speed reducing unit 118 driven by said motor 116 and shown in dotted lines in Fig. 1. Said motor 116 and said speed reducing unit 118 are on a shelf 119 secured to the base. A belt 120 connects a pulley on the motor shaft with a pulley on the speed reducing unit. For clarity, the motor 116 and the shelf 119 and other parts are shown in Fig. 6, notwithstanding the fact that they are at the left of the section line 6—6. When the motor 116 is operated in the proper direction, the speed reducing unit 118 and the pinion 114 and the gear 102 serve to rotate the nut 100 in the direction to move the shaft 92 and the slide 18 and the cutting tool 20 forwardly. The shaft and the slide and the tool are moved forwardly to successively different positions dependent upon tool dressing, forward movement being stopped by the feed limiting elements 30 and 246. When the motor 116 is reversed, said parts serve to rotate the nut 100 in the opposite direction to move said shaft and said slide and said tool rearwardly. Said shaft is always moved rearwardly to the same rearward position, but the slide and the tool may have successively different rearward positions, as hereinafter fully explained. It will be understood that the width of the pinion 114 is such that it remains in mesh with the gear 102 notwithstanding the forward and rearward movement of the latter.

Connected with the hub 112 on the shaft 92 is a disc 122 provided with a manually engageable handle 124. The handle 124 is preferably connected with the disc by means of a bolt entered in an annular T-slot 126 in said disc. By means of the handle the shaft 92 may be turned to move the slide 18 and the tool forwardly or rearwardly for purposes of set-up. After the position of the tool has been properly adjusted by means of the handle, the disc 122 may be locked in adjusted position by means of a strap 128 connected to the disc by a bolt 130 entered in said T-slot 126. The strap 128 has a slot therein which receives a pin 132 projecting forwardly from the base. The disc 122 and the handle 124 are movable forwardly and rearwardly with the shaft 92 and it will be evident that the engagement of the strap 128 with the pin 132 permits such movement but nevertheless prevents any rotative movement of the disc or of the shaft.

Mounted on the base adjacent the cam disc 104 are two electrical switches 134 and 136, the functions of which will be fully described in connection with the wiring diagram in Fig. 13. The switch 134 has a spring-pressed plunger 138 which normally engages the periphery of a cam ring 140 carried by said disc 104, the disc thus holding the switch in one position. Said ring 140 has at least one notch 142 and when the notch registers with the plunger 138 said plunger moves into the notch and the switch moves to another position. The cam ring 140 carries a button 144 and the switch 136 has a plunger 146 engageable with said button. The button is so located that it does not engage or interfere with the plunger 138 for the switch 134. When the button engages the plunger as shown in Fig. 1 the switch is in one position, and when the button is moved by the cam ring out of engagement with the plunger the switch is moved to another position. The cam ring 140 is readily removable and is readily replaceable by a different ring having a different relationship between the notch 142 and the button 144.

*Means for adjusting wheel engaging or dressing device*

The rotary cutting tool 20, whether it be a grinding wheel or otherwise, must be dressed periodically and as the result of the dressing the active portion of the cutting face of the tool is subject to a rearward change in position relatively to the tool support 18. The device 24, whether a wheel dressing device or otherwise, serves when in engagement with the cutting face of the tool as a means for indicating the position of said cutting face relatively to said support or slide. Preferably said device 24 is a wheel dressing device. It is so shown and will be so described.

The wheel dressing device 24 is adjustable toward the wheel 20 and into engagement with the cutting face thereof. When the wheel is rotatable about a generally longitudinal axis, the wheel dressing device is preferably at the rear of the wheel so that the active wheel dressing elements thereof engage the wheel approximately at the level of the axis thereof. While the invention is not necessarily so limited, the wheel dressing device is preferably carried by the wheel support or slide 18 so as to be bodily movable therewith. When the dressing device is so located, it is preferably carried by a slide such as 26 on said wheel slide 18. Any adjustment of the dressing device is made relatively to the slide 18 and in the forward direction.

Figure 8:
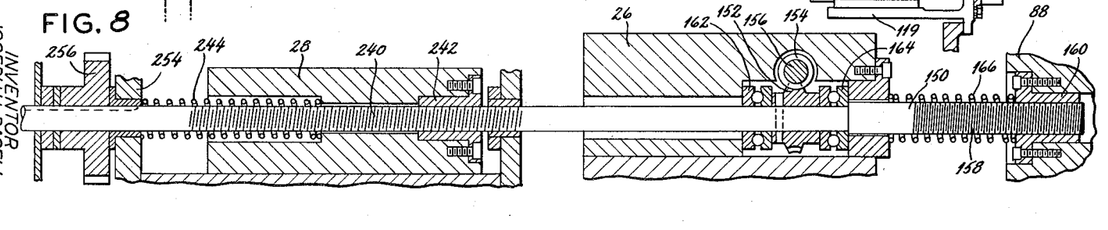
Fig. 8 is an enlarged fragmentary sectional view of certain parts shown in the left portion of Fig. 6.

As best shown in Figs. 6 and 8, the slide 26 is supported upon and guided by a block 148 secured to the slide 18, suitable guideways being provided which are not shown. For adjusting the slide 26 and the parts carried thereby transversely, that is, forwardly or rearwardly, there is provided a transverse shaft 150 which extends through an opening in the slide 26 and is rotatable by means of a worm wheel 152 splined to the shaft and engaged by a worm 154 on a longitudinal shaft 156. The shaft 150 is threaded for effecting transverse movement of the slide 26 upon rotation of the shaft, and as shown the threads for this purpose are provided at 158 on the front portion of the shaft, said threads being engaged with a nut 160 fixedly secured to the projection 88 on the slide 18. The worm wheel 152 is rigidly connected with the shaft 150, and ball bearings 162 and 164 at the front and rear of said worm wheel cause the slide 26 to move transversely in unison with transverse movements of the shaft 150. Preferably a spring 166 is provided which surrounds the front portion of the shaft 150 and serves to bias the slide 26 and the shaft 150 rearwardly so as to take up any possible lost motion in the engagement of the threads 158 with the nut 160.

For rotating the shaft 150 and for thus effecting transverse adjustment of the slide 26 and of the wheel dressing device, there is provided a motor 168 carried by the slide 26 and preferably located at the right side of the machine as shown in Figs. 4 and 5. Connected with the motor 168 is a speed reducing unit 170 having a pinion 172 which meshes with a gear 174 on said shaft 156. It will be seen that when the motor 168 is operated the shaft 156 is rotated at a greatly reduced speed to adjust the slide 26 and the wheel dressing device.

For controlling the operation of the wheel dressing feed motor 168 there is provided a switch 176 which, as shown in Fig. 4, is at the left of a box 178 adjacent the motor 168 and the speed reducing unit 170. The switch 176 has an operating arm 180 carrying a roller 182, as shown in Fig. 5, and the gear 174 has a plurality of similar circumaxially spaced longitudinally projecting pins 184 which are engageable with the roller as the gear rotates. As each pin engages the roller the switch is operated, as more fully described in connection with the wiring diagram in Fig. 13. As shown, there are six pins but the number may be varied. Furthermore, some of the pins may be removed during set-up to vary the conditions of operation.

Details of wheel dressing device

The details of the wheel dressing device may be widely varied, but said device must be adapted for dressing the wheel to the particular shape required for the work to be ground. In the machine as illustrated, the wheel must grind V-shaped threads in a tap blank such as W and the wheel dressing device must therefore be adapted for dressing the wheel to provide it with the required V shape. As shown, the dressing device includes two similar wheel dressing tools 186 and 188 which are movable to dress the wheel 20 at opposite sides thereof. When the threads to be ground are of conventional V shape, the tools 186 and 188 are movable in planes at an angle of 60° to each other. It will sometimes be necessary to provide a third tool movable longitudinally for dressing the extreme outer edge of the wheel, but for grinding small taps this is not necessary and no third tool is shown.

Figure 9:
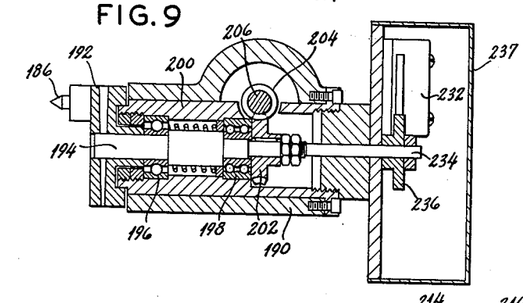
Fig. 9 is an enlarged fragmentary sectional view taken along the line 9—9 of Fig. 4.

The tools 186 and 188 and the holding and operating means therefor are carried by a frame 190 supported on the slide 26. The means for holding and operating the two tools 186 and 188 are similar and a description of one said means will be sufficient. As shown in Fig. 9, the tool 186 is carried by a head 192, said head being connected with a horizontal spindle 194 supported in bearings 196 and 198 in a sleeve 200 within the frame 190. Connected with the spindle 194 is a worm wheel 202 which engages a worm 204 on a shaft 206. The tool 186 is eccentrically mounted on the head 192 and in its intial position is above center. The other tool 188 is similarly mounted on its head but is below center in its initial position.

Figure 10:
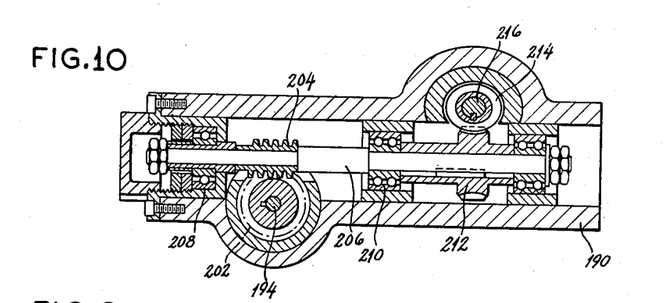
Fig. 10 is an enlarged fragmentary sectional view taken along the line 10—10 of Fig. 4.

As shown in Fig. 10, the shaft 206 is carried by bearings 208 and 210 in the frame 190 and said shaft is connected with a worm wheel 212 which meshes with a worm 214 on a shaft 216. It will be seen that when the shaft 216 is turned, it serves to turn the shaft 206 which in turn serves to turn the spindle 194 and to rotate the tool 186.

Figure 11:
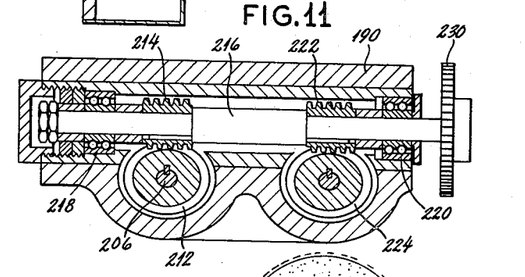
Fig. 11 is a fragmentary vertical sectional view taken along the line 11—11 of Fig. 4.

As shown in Fig. 11, the shaft 216 is mounted in bearings 218 and 220 in the frame 190. Said shaft 216 carries not only the worm 214 which meshes with the worm wheel 212 but also a similar worm 222 which meshes with a worm wheel 224 for the dressing tool 188. It will be clear that when the shaft 216 is turned, the two worm wheels 212 and 224 are turned and these serve as already described to rotate the respective dressing tools 186 and 188.

For rotating the shaft 216 there is provided a motor 226 carried by the slide 26 and having a pinion 228 meshing with a gear 230 on said shaft 216. It will be apparent that rotation of the motor serves through the various parts that have been described to rotate both the dressing tools 186 and 188. The tool 186 starts from an upper position and the tool 188 starts from a lower position and each tool is rotated through a single revolution back to its starting position.

For controlling the operation of the motor 226 which operates the dressing device, there is provided a switch 232. The spindle for one of the dressing tools, which may be the spindle 194, is provided with an extension 234 which carries a cam 236. The switch 232 is positioned adjacent said cam 236 so as to be operated thereby. The cam and the switch are shown as enclosed in a box 237. It will be apparent that the cam 236 makes one rotation for each revolution of the dressing tools, and as hereinafter explained the cam 236 operates the switch 232 at the end of one rotation.

Feed limiting means

The size or diameter of the finished work after cutting or grinding is dependent upon the extent of forward movement of the cutting tool or grinding wheel and it is therefore necessary to very accurately limit this forward movement. The forward movement of the cutting tool or grinding wheel is effected by the movement of the support or slide 18, but the forward position of the slide must vary in accordance with variations in the cutting or grinding face of the tool or wheel after dressing. In order to accurately position the cutting tool or wheel, notwithstanding changes in the relative position of the cutting face thereof, there is provided the before-mentioned compensation member 28 which is normally movable in unison with said tool support or slide but which is adjustable transversely relatively thereto in accordance with the change in the relative position of said cutting face. The means for limiting the forward feeding is directly dependent upon the forward movement of said compensation member and is not directly dependent upon the forward movement of the cutting tool or of the support therefor.

As best shown in Fig. 6, the compensation member 28 is supported on a block 238 carried by the slide 18, suitable guideways being interposed between said block and said member. Said compensation member is preferably at least partly enclosed within a housing 239. The shaft 150 or an extension thereof is positioned within an opening in said member 28 and said shaft is provided with threads at 240 which engage a nut 242 rigidly connected with said member. The compensation member must move rearwardly relatively to the slide 18 to exactly the same extent that the slide 26 and the dressing device moves forwardly. With the particular construction shown, the shaft 150 moves bodily forwardly with the dressing device and therefore the threads 240 in order to effect the required movement of the compensation member must have a lead which is twice as great as that of the threads at 158. Preferably a spring 244 surrounds the rear portion of the shaft 150 and tends to bias the compensation member 28 forwardly so as to take up any possible lost motion in the threads 240 and in the corresponding threads of the nut.

As will be hereinafter explained, the forward feeding of the cutting tool or grinding wheel may be interrupted at an intermediate position, but the means for finally limiting forward feeding movement includes a first element such as 30 and a second element such as an abutment 246, said elements being held in normally fixed relationship respectively to the compensation member 28 and to the base 10 and said means further includes devices dependent upon forward movement of the first element such as 30 into a predetermined relationship with the second element such as 246 for finally interrupting the forward movement of the tool support or wheel slide by said operating mechanism 22. The element 30 is preferably an electrically sensitive unit which includes electrical control elements connected with a relay switch 247 shown in Fig. 13 and which also includes an armature 248 movable relatively to said control elements and engageable with said element or abutment 246 carried by the base. As the slide 18 and the parts carried thereby, including the compensation member 28, move forwardly, the armature 248 contacts the element 246 and said armature is relatively moved to a predetermined critical position with respect to said control elements to effect the operation of said switch 247, said switch serving to interrupt the forward movement of the tool support or slide 18 by the said operating mechanism 22. The operation of the said electrically sensitive unit 30 and of the parts associated therewith will be more fully described in connection with the wiring diagram in Fig. 13.

The element 246 is preferably adjustable transversely relatively to the base so as to adjust the forward portion of the cutting tool or wheel and so as to thus control the size or diameter of the finished work. Said element 246 may conveniently be the spindle of a micrometer head 250 carried by a bracket 251 on the base 14.

*Mechanism for supplementally adjusting tool support relatively to operating mechanism*

In the operation of the machine as thus far described the tool support or slide 18 and the tool such as the grinding wheel 20 are adjusted progressively forwardly as the cutting face recedes rearwardly in accordance with successive tool dressings. However, the rearward movement of the tool support and tool is controlled by the button 144 and the switch 146, the rearward position being always the same. The result is that in the absence of any means for preventing it, the total range of forward and rearward travel of the tool support and the tool increases and may become objectionably large. In order to avoid the increase in the range of travel and to obtain other advantages as hereinafter pointed out, means is preferably provided for forwardly adjusting the said rearward position. For this purpose the nut 96 which is engaged by the threads 95 on the shaft 92 is rotatable relatively to the slide 18 instead of being fixedly secured thereto. By rotation of the nut 96 the slide 18 and the parts carried thereby are moved forwardly relatively to the operating mechanism, more particularly the shaft 92 thereof. This relative forward movement affects only the rearward position of the tool support or slide 18 and of the tool or grinding wheel and does not in any way affect the forward cutting or grinding position of said support and tool which is controlled by the feed limiting means as previously described, this means including the element 30 on the compensation member 28 and the element 246 on the base.

Preferably the relatively forward adjustment of the tool slide and of the parts carried thereby is effected in synchronism with the adjustment of the wheel dressing device and of the compensation member. In order that such synchronous adjustment may be effected the nut 96 is connected with a rearwardly extending rotatable shaft 252. A vertical plate 254 carried indirectly by the slide 18 provides bearings for the rear portions of the shafts 150 and 252. Adjacent the said plate are gears 256 and 258 connected respectively with said shafts 150 and 252. An idler gear 260 is carried by the plate 254 and meshes with said gears 256 and 258. By means of the said gears 256, 260 and 258 the shaft 252 is turned in unison with the shaft 150, the result being that the nut 96 is turned so as to adjust the slide 18 forwardly relatively to the shaft 92 to the same extent that the wheel dressing slide 26 is adjusted forwardly with respect to the slide 18.

*General summary of manner of operation*

When an electrically sensitive unit such as 30 is provided, this unit and the parts directly associated therewith serve as the means for limiting forward feeding movement of the cutting tool or grinding wheel. The control of workpiece size or diameter is effected solely by the cooperation of the elements 30 and 246, there being no stop or feeler or the like that directly engages the workpiece to sense or measure the size thereof. Said elements 30 and 246 serve to limit forward feeding of the tool with the compensation member 28 always in an exactly predetermined position.

Figure 12:
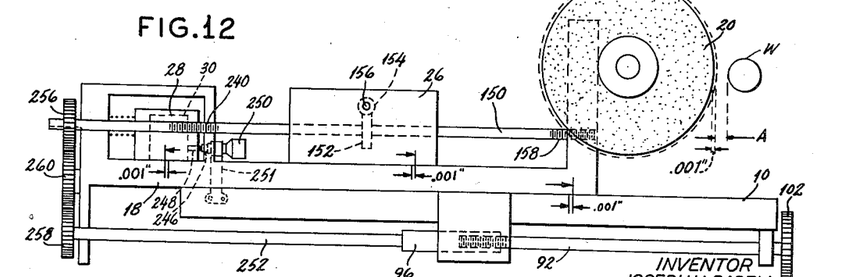
Fig. 12 is a schematic view somewhat similar to Fig. 6 but showing the relative adjustment of some of the parts.

Referring particularly to the schematic Fig. 12, it may be assumed that with the grinding wheel 20 located as indicated by a dotted circle it is in its rearward position and has a radius R. The forward face of the wheel 20 is initially so spaced from the workpiece W that the wheel must be fed forwardly by a distance A for grinding said workpiece to the required diameter. The relationship between the movable and stationary feed limiting elements 30 and 246 is such that they reach their critical relationship to limit feeding when the wheel slide 18 and wheel 20 have been fed forwardly through said feeding distance A. The compensation member 28 is then in its said predetermined position. When wheel dressing is necessary after any grinding operation, it may be assumed that the dressing device 24 and the slide 26 therefor are moved forwardly relatively to the wheel slide 18 by .001″, thus reducing the wheel radius to R—.001″ and increasing to A+.001″ the distance that the wheel must be fed forwardly for grinding the workpiece to the required diameter. The compensation member 28 and the movable feed limiting element 30 are moved rearwardly relatively to the wheel slide 18 and relatively to the operating mechanism 22 by .001″, but the position of the stationary feed limiting element 246 on the base remains unchanged. For the present, it may be assumed that the nut 96 is not rotated, and the movable element 30 is therefore spaced rearwardly from the stationary element 246 by an additional .001″. In order for the movable element 30 to reach its said critical relationship with the stationary element 246 for limiting feeding and for the compensation member 28 to reach its said predetermined position, said element 30 and said member 28, together with the slide 18 and the wheel 20, must be moved forwardly through the distance A+.001″ which is exactly the above stated distance through which the wheel of reduced radius must be fed to grind the workpiece to said required diameter.

When the nut 96 is rotated as described, the slide 18 and the parts thereon are moved forwardly relatively to its feed mechanism and more particularly the shaft 92 thereof during each wheel dressing, and in accordance with the assumed example they are moved .001″. This maintains the original relationship between the rearward position of the movable element 30 on the compensation member 28 and the stationary element 246 on the base. With the slide 18 so adjusted forwardly by the nut 96, the forward feeding of the wheel is always through the original distance A.

For accuracy of the finished workpieces, it is essential that the threads 158 and 240 on the shaft 150 be very accurate so that the rearward movement of the compensation member is exactly equal to the forward movement of the wheel dressing device. However, it is not necessary to have great accuracy in the threads on the shaft 92 and the nut 96 or in the gearing connecting the shaft 150 with the shaft 252, as the size or diameter of the finished workpieces is controlled entirely by the elements 30 and 246 and is not affected by any inaccuracy in adjustment of the rearward position of the slide 18 and the wheel 20.

Figure 13:
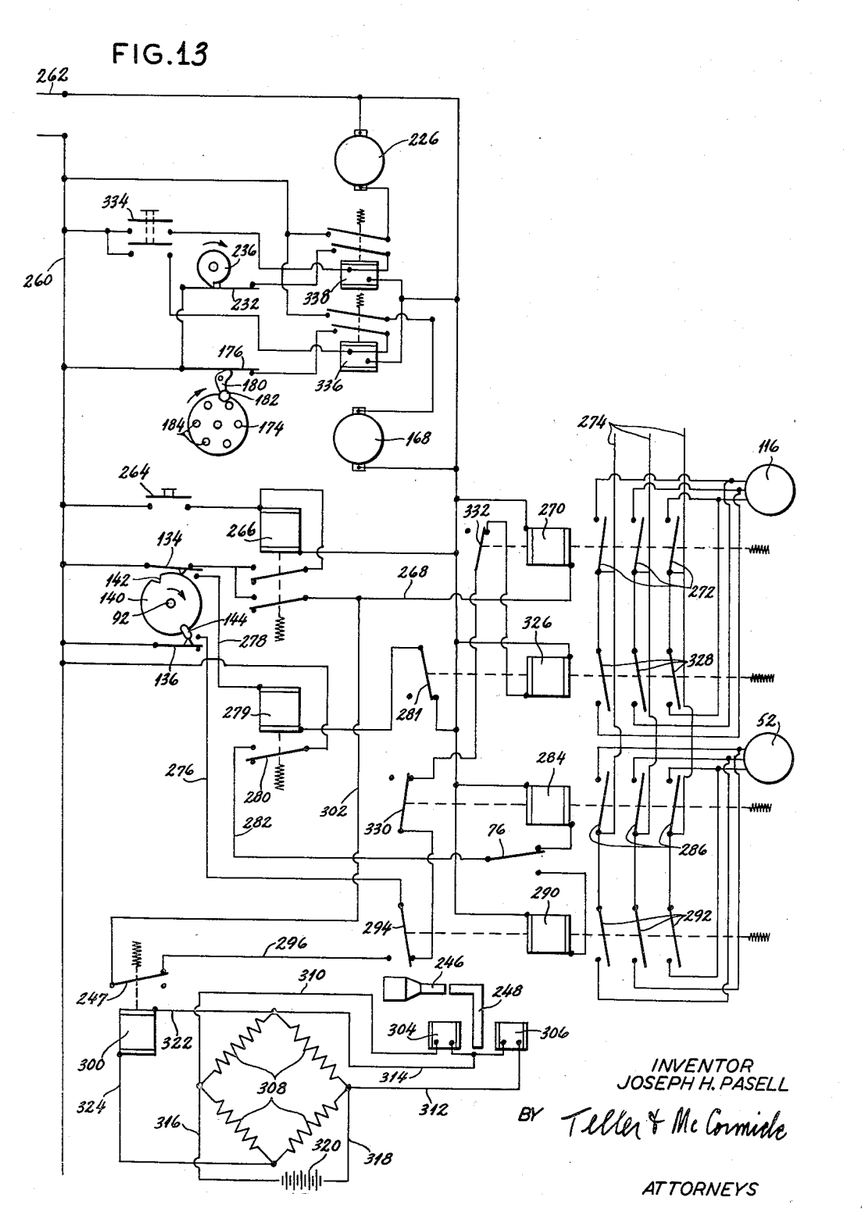
Fig. 13 is a diagram of electrical connections.

*More specific description of manner of operation with particular reference to wiring diagram in Fig. 13*

Fig. 13 is an electrical diagram and some of the various electrical parts shown therein have been previously mentioned and are shown in other figures. Many other electrical parts are not shown otherwise than in Fig. 13 and it will be understood that these can be located on a suitable panel board or otherwise as found most convenient. Certain manually operable switches should be so located as to be within easy reach of the machine operator.

In describing the manner of operation it will be assumed that all preliminary or set-up adjustments have been made, that the slide 18 and the grinding wheel 20 are in their rearmost positions and that a new workpiece or tap blank W has been put in place ready for the grinding of a thread therein. The lever of the table operated swtch 76 has been moved toward the left by the pin 80.

The main leads for the contact circuits are shown at 260 and 262. Connected across said leads is a normally open manually operable switch 264 in series with a relay 266, said switch being within convenient reach of the machine operator. When the switch 264 is closed, the relay is energized and a relay holding circuit is established through the before-mentioned switch 134 which is held closed by the ring 140. At the same time a circuit is established through said switch 134 and a conductor 268 to energize a relay 270. Said relay 270 has contacts 272 which when moved toward the left connect the feed motor 116 with main power leads 274 for operation in the feeding direction to turn the nut 100 and the ring 140 in the clockwise direction as viewed in Figs. 1 and 13, this being the direction for feeding the slide 18 and the grinding wheel 20 in the forward direction. The ring 140 constitutes a control member connected with said operating mechanism and movable in one direction during forward feeding of the wheel support or slide and reversely movable during rearward movement of the wheel support or slide.

As soon as the ring 140 starts to turn, it permits the closing of the before-mentioned switch 136, thus partly establishing a circuit through a conductor 276 for the reverse rotation of the motor 116 as hereinafter fully described.

Figures 2, 3:
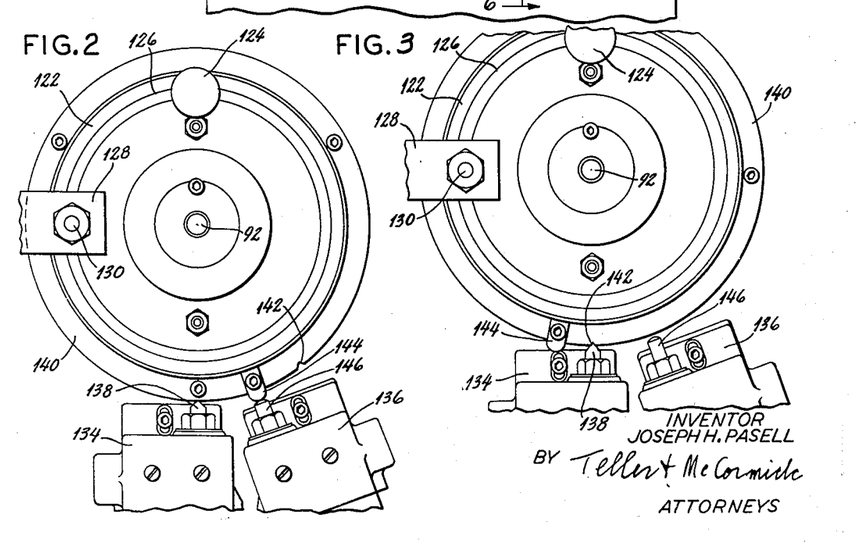
Fig. 2 is an enlarged front view of a portion of the wheel slide operating mechanism as shown in Fig. 1.
Fig. 3 is a view similar to Fig. 2 but showing the parts in different relative positions.

When the ring 140 has rotated to the position shown in Fig. 3, the plunger 138 of the switch 134 enters the notch 142 in said ring and the switch is operated to break the holding circuit for the relay 266, thus de-energizing the relay 270 and stopping forward feeding by the motor 116. As before stated, the motor is equipped with an automatic brake and is stopped practically instantaneously when its circuit is broken. The notch 142 is so located with respect to the starting position of the ring 140, as shown in Fig. 2, that the switch 134 stops the motor 116 with the grinding wheel fed forwardly to an intermediate forward position wherein it will cut threads in the blank W having a pitch diameter slightly larger than the required final pitch diameter. Said intermediate forward position is spaced forwardly from the rearward position a definite predetermined extent.

It will be understood that during set-up, or thereafter if necessary, the intermediate size or diameter of the workpiece may be determined or changed by the rotary adjustment of the shaft 92 within the nut 96, such adjustment being effected by the disc 122 and the handle 124. This adjustment changes the rearward position of the wheel slide and wheel, said intermediate forward position being directly dependent upon said rearward position.

The switch 134 when operated also closes a circuit through a conductor 278 and through a relay 279 having a contact 280. The relay 279 is also preferably in series with a normally closed interlock switch 281 for a purpose to be described. The relay 279 upon being energized closes a circuit through a conductor 282 and the table operated switch 76 to energize a relay 284. Said relay 284 has contacts 286 which when moved toward the left connect the work motor 52 with the main leads 274 for operation in the direction to move the slide or table 44 and the blank W toward the right, or toward the shank of the tap blank. As the table so moves, the wheel grinds threads in the blank W which threads have a pitch diameter slightly larger than the required final pitch diameter.

At the end of table travel toward the right the pin 78 operates the switch to the position opposite to that shown in Figs. 1 and 13. This de-energizes the relay 284 to stop the work motor 52 and energizes a relay 290. Said relay 290 has contacts 292 which when moved toward the left connect the work motor 52 with the leads 274 for operation in the reverse direction, that is, in the direction to move the slide or table 44 and the partially ground blank W toward the left or toward the point of the tap blank.

The relay 290 has an additional contact 294 which is moved toward the left simultaneously with the contacts 292. The contact 294 closes a circuit through the feed motor forward relay 270 as follows: closed switch 136, conductor 276, contact 294, conductor 296, the before-mentioned switch 247 which is a contact on a relay 300, conductor 302 and conductor 268. The energization of the relay 270 starts the operation of said feed motor 116 to additionally feed the grinding wheel forwardly. This additional feeding involves additional clockwise rotation of the ring 140 but the notch 142 is of such width that the switch 134 is not operated. The additional forward feeding of the grinding wheel continues until the relay circuit is broken by the contact 247 of the relay 300. The relay 300 and said contact 247 thereof are controlled by the feed limiting means comprising the movable element 30 and the stationary element or abutment 246. Upon the breaking of the circuit by said relay the motor 116 is stopped practically instantaneously as before stated. The described additional forward operation of the feed motor 116 requires only a few seconds and this takes place during the short interval before the wheel 20 again engages the threads during the movement of the blank W toward the left. Final grinding of the threads to the exact predetermined pitch diameter as determined by said feed limiting means takes place during the last said movement of the blank toward the left.

The electrically sensitive unit 30 carried by the compensating member 28 is shown schematically in the lower portion of Fig. 13. Said unit includes electrical control elements connected with said relay switch 300 and it also includes the before-mentioned armature 248 which is movable relatively to said control elements and is engageable with said abutment 246 upon forward movement of said wheel support 18 and of said compensation member 28. Said armature 248 upon engagement with said abutment 246 and upon relative movement thereby to a predetermined critical position causes said control elements to effect the operation of said relay switch 300 to interrupt the forward movement of the wheel support by said operating mechanism when said support is in such position that the wheel grinds the corresponding workpiece to said predetermined diameter.

As shown, the electrical control elements of said unit include two similar induction coils 304 and 306 spaced apart and in fixed relationship to each other and there are also provided balanced resistance elements which may be the resistance elements of a Wheatstone bridge 308. Two corners of said bridge 308 are connected with said coils 304 and 306 by conductors 310 and 312 and said coils are connected with each other and with one of the other two corners of said bridge by a conductor 314. The first said corners of the bridge are connected by conductors 316 and 318 with a suitable current source such as a battery 320. The second two corners of said bridge are connected by conductors 322 and 324 with said relay switch 300. The armature 248 or a portion thereof is biased to a position midway between the coils 304 and 306 as shown in Fig. 13.

When the armature 248 is in its midway position as shown, there is an electrical balance and no current flows to the relay 300. During forward movement of the wheel slide 18 and of the compensation member 28, the entire unit 30 is moved toward the left as viewed in Fig. 13. When the armature 248 engages the element or abutment 246 its movement is stopped, but the remainder of the unit 30 continues to move so that the armature is relatively moved out of its midway position toward the right and nearer the coil 306. When the armature is thus relatively moved, the electrical balance is destroyed and current flows to the relay 300 to energize it and to thereby break the circuit at the switch or contact 247 and thus stop or limit forward feeding by the motor 116. The unit 30 is very sensitive and accurate, and during repeated cycles the relay 300 is always operated at exactly the same relative position of the armature 248, and therefore the grinding wheel 20 is always stopped in exactly the same forward position with the result that the workpieces are always ground to exactly the same final size or diameter.

It will be understood that during set-up, or thereafter if necessary, the final size or diameter of the workpiece may be determined or changed by the adjustment of the micrometer head 250 to adjust the position of the abutment 246.

At the end of the movement of the slide or table 44 and of the workpiece W toward the left and back to the position shown in Fig. 1, the pin 80 operates the switch 76 to restore it to the position shown in Figs. 1 and 13. The operation of the switch 76 de-energizes the relay 290 and restores the contact 294 to the position shown in Fig. 13. A circuit is thus established to energize a relay 326. Said relay has contacts 328 which when moved toward the left connect the motor 116 with the power leads 274 for operation in the reverse direction for retracting the slide 18 and the grinding wheel 20, that is, for moving them in the rearward direction. The circuit for the relay 326 includes: closed switch 136, conductor 276, contact 294, a contact 330 on relay 284, and a contact 332 on relay 270. Said contacts 330 and 332 permit energization of the relay 326 only when the relays 284 and 270 are de-energized. The motor 116 operates in said reverse direction until the button 144 opens the switch 136 to break the circuit through said relay 326. This stops the shaft 92 in a fixed rearward position. The rearward position of the slide 18 and the wheel 20 is normally fixed, but the last said position may be adjusted as before described by the rotation of the nut 96.

The restoration of the switch 76 to the position shown in Fig. 13 also serves to partly establish a circuit through the contact 280 of the relay 279, the conductor 282 and said switch 76 to energize the relay 284 for movement of the slide 44 toward the right or toward the shank end of the blank during the next following cycle. In order to prevent immediate operation of the motor 52, the circuit for said relay 279 includes the before-mentioned interlock switch 281. Said contact 281 is operable by said relay 326 when energized to operate the feed motor 116 in the reverse direction, and it serves to momentarily break the circuit through said relay 279. The last said relay when de-energized breaks the circuit for the relay 284 for the work motor 52 to prevent immediate operation thereof. The circuit at the contact 281 is broken only during the reverse operation of the motor 116, but shortly after said reverse rotation has started the circuit of the relay 279 is broken at the switch 134 and this prevents energization of said relay after the circuit is again closed at the contact 281.

The retraction of the wheel slide and wheel to their said rearward position by the last described operation of the motor 116 completes the machine cycle. The operator then removes the ground tap and replaces it with a new tap blank W. The next cycle is started by the manual operation of the switch 264.

As before stated, it is necessary to periodically dress the grinding wheel 20. This is done by means of the dressing device 24 with the wheel slide and wheel in their rearward position at the end of a grinding cycle.

For periodically dressing the wheel a normally open manually operable switch 334 is connected across the leads 260 and 262, said switch being within convenient reach of the machine operator. The switch has a lower contact in series with a relay 336. When the switch 334 is closed, said relay 336 is energized and a relay holding circuit is established through the lower contact of said relay and through the before-mentioned switch 176 which is closed. The energization of the relay 336 serves through the upper contact thereof to complete a circuit through the motor 168 for forwardly feeding the wheel dressing device 24.

As before-stated, the switch 176 is operable by an arm 180 having a roller 182. Pins 184 are provided on the gear 174, each pin being engageable with the roller 182 to momentarily open the switch 136. The momentary opening of the switch 176 breaks the holding circuit for the relay 336 and the motor 168 is therefore stopped after the wheel dressing device has been fed forwardly to a predetermined extent. Each pin 180 serves to open the switch 176 and the inertia of the motor 168 and of connected parts is such as to rotate the gear 174 sufficiently to permit the switch to again close.

The gearing ratio is such that there is a selected amount of feeding of said dressing device for each closing of the switch 334 and each corresponding operation of the motor 168. For example, with six pins 184 in place the extent of feeding may be .001". By removing each alternate pin, the extent of feeding could be increased to .002".

The switch 334 has an upper contact in series with a relay 338. When the switch 334 is closed, the relay 338 is energized and a relay holding circuit is established through the lower contact of said relay and through the before-mentioned switch 232 which is closed. The energization of the relay 338 serves through the upper contact thereof to complete a circuit through the motor 226 for operating the wheel dressing device 24.

As before stated, a cam 236 is provided which makes one rotation for each revolution of the wheel dressing tools 186 and 188. This cam serves after one revolution to momentarily open the switch 232. The momentary opening of the switch 232 breaks the holding circuit for the relay 338 and the motor 226 is therefore stopped after the wheel dressing tools have made one complete revolution. The cam 236 is shaped to open the switch 232 after nearly a complete rotation and the inertia of the motor 226 and of connected parts serves to complete the rotation of the cam so as to permit the switch 232 to again close.

It will be observed that the motor 168 for feeding the dressing device and the motor 226 for operating the dressing device are started simultaneously by the switch 334. However, the feed motor 168 acts very quickly and feeding is ordinarily completed before the dressing tools have been moved far enough to engage the wheel. Upon the completion of the operation of the wheel dressing device the machine is ready for the next following grinding cycle.

The means for adjusting the compensation member rearwardly in relation to the wheel slide and in unison with the feeding movement of the wheel dressing device has been described and explained in detail, and the feed limiting means dependent upon the forward movement of the compensation member with the wheel slide has also been described and explained in detail. The two last said means cooperate for accurately determining or limiting the final size or diameter of the workpiece, and so far as concerns said final size or diameter it may be optical whether a means, such as the rotatable nut 96, is provided for adjusting the rearward position of the wheel slide and wheel. However, when the size or diameter is determined in two stages as has been described, it is essential to provide said means for adjusting said rearward position.

The limitation of forward feeding of the grinding wheel for the first stage is controlled entirely by the rotation of the ring or control member 140, and this member stops forward feeding after a predetermined extent of forward feeding from the rearward position of the slide and wheel. However, when the wheel radius is reduced by wheel dressing, it is essential that the rearward position of the wheel and slide be correspondingly adjusted forwardly. Without the last said adjustment, it would be useless to effect forward feeding to a predetermined extent from a permanently fixed rearward position, as this would result for the first stage in an increased workpiece size or diameter corresponding to each reduction in wheel radius.

The invention claimed is:

1. In a machine for cutting a succession of similar longitudinal workpieces to a predetermined diameter, the combination of a base, means on said base for holding each workpiece and for rotating it about a fixed longitudinal axis, a transversely movable support on said base for a cutting tool rotatable about a generally longitudinal axis and having a peripheral cutting face and subject to a reduction in radius as the result of dressing, operating mechanism for moving said tool support forwardly so as to feed said tool to a forward cutting position and for subsequently moving said support rearwardly, a device bodily adjustable into engagement with the periphery of said cutting tool, a compensation member separate from the operating mechanism and normally movable in unison with said tool support but adjustable transversely relative thereto and independently of said operating mechanism, a feed limiting means dependent upon the forward movement of said compensation member relatively to the operating mechanism for interrupting the forward movement of the tool support by said mechanism when said support is in such position that the cutting tool cuts the corresponding workpiece to said predetermined diameter, and a common means separate from said operating mechanism for adjusting the tool engaging device in such manner and to such extent that it engages the periphery of the tool when the radius thereof has been reduced and for simultaneously adjusting the compensation member rearwardly relatively to said tool support and relatively to said operating mechanism to an extent equal to said adjustment of said device corresponding to the reduction in tool radius so that the feed limiting means interrupts the forward movement of the tool support means when it is in such different position that the tool cuts the next following workpiece to said predetermined diameter notwithstanding said reduction in tool radius.

2. In a machine for grinding a succession of similar workpieces to a predetermined size, the combination of a base, means on said base for holding each workpiece in a predetermined position, a transversely movable support on said base for a rotatable grinding wheel having a grinding face engageable with a workpiece on said holding means, operating mechanism for moving said wheel support forwardly so as to feed said wheel to a forward grinding position and for subsequently moving said support rearwardly, a wheel dressing device bodily adjustable into engagement with said grinding face of the wheel, a compensation member separate from said operating mechanism and normally movable in unison with said wheel support but adjustable transversely relative thereto and independently of said operating mechanism, a feed limiting means dependent upon forward movement of said compensation member relatively to said operating mechanism for interrupting the forward movement of the wheel support by said mechanism when said support is in such position that the wheel grinds the corresponding workpiece to said predetermined size, and a common means separate from said operating mechanism for adjusting the dressing device toward the wheel to the extent necessary to dress said wheel with a resultant rearward change in the position of the grinding face thereof relatively to the support and for simultaneously adjusting the compensation member rearwardly relatively to said wheel support and relatively to said operating mechanism to an extent equal to said adjustment of said dressing device resulting in said rearward change in the position of the grinding face so that the feed limiting means interrupts the forward movement of the wheel support when it is in such different position that the wheel grinds the next following workpiece to said predetermined size notwithstanding said rearward change in the position of said grinding face.

3. In a machine for grinding a succession of similar longitudinal tap blanks to form threads having a predetermined pitch diameter, the combination of a base, means on said base for holding each blank and for rotating it about a fixed longitudinal axis and for moving longitudinally in synchronism with the rotation as necessary for the required threads, a transversely movable support on said base for a grinding wheel rotatable about a generally longitudnal axis and having a peripheral grinding face with a shape conforming to that of the threads to be ground, operating mechanism for moving said wheel support forwardly so as to feed said wheel to a forward grinding position and for maintaining it in said position during longitudinal movement of said work holding means and for subsequently moving said support rearwardly, a device bodily adjustable relatively to the base and into engagement with the wheel for dressing it to said thread shape, a compensation member separate from said operating mechanism and normally movable in unison with said wheel support but adjustable transversely relatively thereto and independently of said operating mechanism, a feed limiting means dependent upon forward movement of said compensation member relatively to said operating mechanism for interrupting the forward movement of the wheel support by said mechanism when said support is in such position that the wheel grinds threads of said predetermined pitch diameter in the corresponding tap blank during rotative and longitudinal movement thereof, and a common means separate from said operating mechanism for adjusting the dressing device toward the wheel to the extent necessary to dress said wheel at the peripheral face thereof with a resultant reduction in wheel radius and for simultaneously adjusting the compensation member rearwardly relatively to said wheel support and relatively to said operating mechanism to an extent equal to said adjustment of said dressing device resulting in said reduction in wheel radius so that the feed limiting means interrupts the forward movement of the wheel support when it is in such different position that the wheel grind threads of said predetermined pitch diameter in the next following tap blank notwithstanding said reduction in wheel radius.

4. In a machine for grinding a succession of similar workpieces to a predetermined size, the combination of a base, means on said base for holding each workpiece in a predetermined position, a transversely movable slide on said base for supporting a rotatable grinding wheel having a grinding face engageable with a workpiece on said holding means, operating mechanism for moving said wheel slide forwardly so as to feed said wheel to a forward grinding position and for subsequently moving said wheel slide rearwardly, a wheel dressing device normally movable in unison with said wheel slide but bodily adjustable transversely relatively thereto, a compensation member separate from said operating mechanism and normally movable in unison with said wheel slide but adjustable transversely relatively thereto and independently of said operating mechanism, feed limiting means dependent upon forward movement of said compensation member relatively to said operating mechanism for interrupting the forward movement of the wheel slide by said mechanism when said slide is in such position that the wheel grinds the corresponding workpiece to said predetermined size, and a common means separate from said operating mechanism for forwardly adjusting the dressing device relatively to the wheel slide and toward the wheel to the extent necessary to dress said wheel with a resultant rearward change in the position of the grinding face thereof relatively to the slide and for simultaneously adjusting the compensation member rearwardly relatively to said wheel slide and relatively to said operating mechanism to an extent equal to said adjustment of said dressing device resulting in said rearward change in the position of the grinding face so that the feed limiting means interrupts the forward movement of the wheel slide when it is in such different position that the wheel grinds the next following workpiece to said predetermined size notwithstanding said change in the relative position of said grinding face.

5. A machine as set forth in claim 4, wherein the wheel dressing device is adjustable forwardly relatively to said wheel slide, and wherein said common adjusting means includes a single transverse rotatable shaft having threads thereon for effecting the forward adjustment of said dressing device and has other threads thereon for effecting the rearward adjustment of said compensation member.

6. A machine as set forth in claim 5, wherein said shaft has threaded engagement with said slide for effecting forward movement of said shaft when rotated, wherein said dressing device is connected with said shaft for forward movement in unison therewith, and wherein said shaft has threaded engagement with said compensation member for effecting rearward movement thereof simultaneously with said forward movement of said shaft and said dressing device.

7. In a machine for grinding a succession of similar longitudinal tap blanks to form threads having a predetermined pitch diameter, the combination of a base, means on said base for holding each blank and for rotating it about a fixed longitudinal axis and for moving it longitudinally in synchronism with the rotation as necessary for the required threads, a transversely movable slide on said base for a grinding wheel rotatable about a generally longitudinal axis and having a peripheral grinding face with a shape conforming to that of the threads to be ground, operating mechanism for moving said wheel slide forwardly so as to feed said wheel to a forward grinding position and for maintaining it in said position during longitudinal movement of said work holding means and for subsequently moving said slide rearwardly, a device normally movable in unison with said wheel slide but bodily adjustable relatively thereto and into engagement with the wheel for dressing it to said thread shape, a compensation member separate from said operating mechanism and normally movable in unison with said wheel slide but adjustable transversely relatively thereto and independently of said operating mechanism, a feed limiting means dependent upon forward movement of said compensation member relatively to said operating mechanism for interrupting the forward movement of the wheel slide by said mechanism when said slide is in such position that the wheel grinds threads of said predetermined pitch diameter in the corresponding tap blank during rotative and longitudinal movement thereof, and a common means separate from said operating mechanism for forwardly adjusting the dressing device relatively to the wheel slide to the extent necessary to dress said wheel with a resultant reduction in wheel radius and for simultaneously adjusting the compensation member rearwardly relatively to said wheel slide and relatively to said operating mechanism to an extent equal to said adjustment of the dressing device so that the feed limiting means interrupts the forward movement of the wheel slide when it is in such different position that the wheel grinds threads of said predetermined pitch diameter in the next following tap blank notwithstanding said reduction in wheel radius.

8. In a machine for cutting a succession of similar workpieces to a predetermined size, the combination of a base, means on said base for holding each workpiece in a predetermined position, a transversely movable support on said base for a rotatable tool having a cutting face engageable with a workpiece on the holding means and subject to a rearward change in position relatively to the support as the result of tool dressing, operating mechanism for moving said tool support forwardly so as to feed said tool to a forward cutting position and for subsequently moving said support rearwardly to a normally fixed rearward position, a device bodily adjustable into engagement with said cutting face of said tool, a compensation member separate from said operating mechanism and normally movable in unison with said tool support but adjustable transversely relatively thereto, a feed limiting means dependent upon forward movement of said compensation member relatively to said operating mechanism for interrupting the forward movement of the tool support by said mechanism when said support is in such position that the cutting tool cuts the corresponding workpiece to said predetermined size, a common means for adjusting said tool engaging device in such manner and to such extent that it engages said cutting face of the tool when the position of said cutting face relatively to the support has been rearwardly changed and for simultaneously adjusting the compensation member rearwardly relatively to said tool support and relatively to said operating mechanism to an extent equal to said adjustment of said tool engaging device so that the feed limiting means interrupts the forward movement of the tool support when it is in such different position that the tool cuts the next following workpiece to said predetermined size notwithstanding said change in the relative position of said cutting face, and mechanism for effecting relative adjustment between the tool support and the operating mechanism therefor so as to forwardly adjust said normally fixed rearward position of the tool support to an extent approximately equal to said rearward change in the position of the tool cutting face relatively to the tool support.

9. A machine as set forth in claim 8, wherein the operating mechanism includes a transversely extending threaded shaft bodily movable forwardly and rearwardly and further includes a nut in threaded engagement with said shaft and connected with the tool support for normally moving it in unison with the shaft, and wherein the mechanism for effecting relative adjustment between the tool support and the operating mechanism includes means for rotating said nut relatively to said threaded shaft.

10. A machine as set forth in claim 8, wherein the mechanism for effecting relative adjustment between the tool support and the operating mechanism is connected for operation in unison with said common means for adjusting the tool engaging device and the compensation member so that said rearward position of the tool support is adjusted forwardly to the same extent that said compensation device is adjusted rearwardly.

11. In a machine for grinding a succession of similar longitudinal workpieces to a predetermined diameter, the combination of a base, means on said base for holding each workpiece and for rotating it about a fixed longitudinal axis, a transversely movable support on said base for a grinding wheel rotatable about a generally longitudinal axis and having a peripheral grinding face, operating mechanism for moving said wheel support forwardly so as to feed said wheel to a forward grinding position and for subsequently moving said support rearwardly to a normally fixed rearward position, a wheel dressing device bodily adjustable into engagement with the peripheral grinding face of the wheel, a compensation member separate from said operating mechanism and normally movable in unison with said wheel support but adjustable transversely relatively thereto, a feed limiting means dependent upon forward movement of said compensation member relatively to said operating mechanism for interrupting the forward movement of the wheel support by said mechanism when said support is in such position that the wheel grinds the corresponding workpiece to said predetermined diameter, a common means for adjusting the dressing device toward the wheel to the extent necessary to dress said wheel with a resultant reduction in wheel radius and for simultaneously adjusting the compensation member rearwardly relatively to said wheel support and relatively to said operating mechanism to an extent equal to said adjustment of said dressing device resulting in said reduction in wheel radius so that the feed limiting means interrupts the forward movement of the wheel support when it is in such different position that the wheel grinds the next following workpiece to said predetermined diameter notwithstanding said reduction in wheel radius, and mechanism for effecting relative adjustment between the wheel support and the operating mechanism therefor so as to forwardly adjust said normally fixed rearward position of the wheel support to an extent equal to said reduction in wheel radius.

12. A machine as set forth in claim 11, wherein the operating mechanism includes a transversely reciprocable control member movable forwardly to different forward positions as limited by the feed limiting means and movable rearwardly always to the same rearward position, and wherein the mechanism for forwardly adjusting the rearward position of the wheel support serves to adjust said support forwardly relatively to said transversely reciprocable control member.

13. In a machine for grinding a succession of similar longitudinal workpieces to a predetermined diameter, the combination of a base, means on said base for holding each workpiece and for rotating it about a fixed longitudinal axis, a transversely movable slide on said base for supporting a grinding wheel rotatable about a generally longitudinal axis and having a peripheral grinding face, operating mechanism for moving said wheel slide forwardly so as to feed said wheel to a forward grinding position and for subsequently moving said slide rearwardly to a normally fixed rearward position, a wheel dressing device normally movable in unison with said wheel slide but bodily adjustable transversely relatively thereto, a compensation member separate from said operating mechanism and normally movable in unison with said wheel slide but adjustable transversely relatively thereto, a feed limiting means dependent upon forward movement of said compensation member relatively to said operating mechanism for interrupting the forward movement of the wheel slide by said mechanism when said slide is in such position that the wheel grinds the corresponding workpiece to said predetermined diameter, means including a transverse rotatable shaft having threads thereon for adjusting the dressing device forwardly relatively to the wheel slide to dress said wheel and reduce the radius thereof and having other threads thereon for simultaneously adjusting the compensation member rearwardly relatively to said wheel slide and relatively to said operating mechanism to an extent equal to said forward movement of the dressing device so that the feed limiting means interrupts the forward movement of the wheel slide when it is in such different position that the wheel grinds the next following workpiece to said predetermined diameter notwithstanding said reduction in wheel radius, and means operable by said shaft for effecting relative adjustment between the wheel slide and the operating mechanism so as to forwardly adjust said normally fixed rearward position of the wheel slide to the same extent that said compensation member is adjusted rearwardly.

14. In a machine for cutting a succession of similar workpieces to a predetermined size, the combination of a base, means on said base for holding each workpiece in a predetermined position, a transversely movable support on said base for a rotatable tool having a cutting face engageable with a workpiece on the holding means and subject to a rearward change in position relatively to the support as the result of tool dressing, operating mechanism for moving said tool support forwardly so as to feed said tool to a forward cutting position and for subsequently moving said support rearwardly, a device bodily adjustable into engagement with said cutting face of said tool, a compensation member separate from said operating mechanism and normally movable in unison with said tool support but adjustable transversely relatively thereto, a feed limiting means comprising first and second elements held in normally fixed relationship respectively to the compensation member and to the base and also comprising means dependent upon forward movement of said first element relatively to the operating mechanism and into a predetermined relationship with said second element for interrupting the forward movement of the wheel slide by said operating mechanism when said support is in such position that the cutting tool cuts the corresponding workpiece to said predetermined size, and a common means for adjusting said tool engaging device in such manner and to such extent that it engages said cutting face of the tool when the position of said cutting face relatively to the support has been rearwardly changed and for simultaneously adjusting the compensation member rearwardly relatively to said tool support and relatively to said operating mechanism to an extent equal to said adjustment to said tool engaging device so that the feed limiting means interrupts the forward movement of the tool support when it is in such different position that the tool cuts the next following workpiece to said predetermined size notwithstanding said change in the relative position of said cutting face.

15. In a machine for grinding a succession of similar longitudinal workpieces to a predetermined diameter, the combination of a base, means on said base for holding each workpiece and for rotating it about a fixed longitudinal axis, a transversely movable support on said base for a rotatable grinding wheel having a grinding face engageable with a workpiece on said holding means, electrically driven operating mechanism for moving said wheel support forwardly so as to feed said wheel to a forward grinding position and for subsequently moving said support rearwardly, a switch for interrupting the electrical power supplied to said operating mechanism, and an electrically controlled feed limiting means comprising an abutment and an electrically sensitive unit one in normally fixed relationship with said base and the other in fixed relationship with said wheel support, said electrically sensitive unit including electrical control elements connected with said switch and also including an armature movable relatively to said control elements and engageable with said abutment upon forward movement of said compensation member which armature upon engagement with said abutment and upon relative movement thereby to a predetermined critical position causes said control elements to effect the operation of said switch to interrupt the forward movement of the wheel support by said operating mechanism when said support is in such position that the wheel grinds the corresponding workpiece to said predetermined diameter.

16. In a machine for cutting a succession of similar workpieces to a predetermined size, the combination of a base, means on said base for holding each workpiece in a predetermined position, a transversely movable support on said base for a rotatable tool having a cutting face engageable with a workpiece on the holding means and subject to a rearward change in position relatively to the support as the result of tool dressing, electrically driven operating mechanism for moving said tool support forwardly so as to feed said tool to a forward cutting position and for subsequently moving said support rearwardly, a device bodily adjustable into engagement with said cutting face of said tool, a compensation member separate from said operating mechanism and normally movable in unison with said tool support but adjustable transversely relatively thereto, a feed limiting means dependent upon forward movement of said compensation member relatively to said operating mechanism and including electrical parts which interrupt the electrical power supplied to said operating mechanism to thereby interrupt the forward movement of the tool support when said support is in such position that the cutting tool cuts the corresponding workpiece to said predetermined size, and a common means for adjusting said tool engaging device in such manner and to such extent that it engages said cutting face of the tool when the position of said cutting face relatively to the support has been rearwardly changed and for simultaneously adjusting the compensation member rearwardly relatively to said tool support and relatively to said operating mechanism to an extent equal to said adjustment of said tool engaging device corresponding to the change in the relative position of the tool cutting face so that the feed limiting means interrupts the forward movement of the tool support when it is in such different position that the tool cuts the next following workpiece to said predetermined size notwithstanding said change in the relative position of said cutting face.

17. In a machine for grinding a succession of similar longitudinal workpieces to a predetermined diameter, the combination of a base, means on said base for holding each workpiece and for rotating it about a fixed longitudinal axis, a transversely movable support on said base for a grinding wheel rotatable about a generally longitudinal axis and having a peripheral grinding face, electrically driven operating mechanism for moving said wheel support forwardly so as to feed said wheel to a forward grinding position and for subsequently moving said support rearwardly, a wheel dressing device bodily adjustable into engagement with the peripheral grinding face of the wheel, a compensation member separate from said operating mechanism and normally movable in unison with said wheel support but adjustable transversely relatively thereto, a common means for adjusting the dressing device toward the wheel to the extent necessary to dress said wheel with a resultant reduction in wheel radius and for simultaneously adjusting the compensation member rearwardly relatively to said wheel support and relatively to said operating mechanism to an extent equal to said adjustment of said dressing device resulting in said reduction in wheel radius, a switch for interrupting the electrical power supplied to said operating mechanism, and an electrically controlled feed limiting means comprising an abutment and an electrically sensitive unit one in normally fixed relationship with said base and the other in normally fixed relationship with said compensation member, said electrically sensitive unit including electrical control elements connected with said switch and also including an armature movable relatively to said control elements and engageable with said abutment upon forward movement of said compensation member relatively to said operating mechanism which armature upon engagement with said abutment and upon relative movement thereby to a predetermined critical position causes said control elements to effect the operation of said switch to interrupt the forward movement of the wheel support by said operating mechanism when said support is in such position that the wheel grinds the corresponding workpiece to said predetermined diameter.

18. A machine as set forth in claim 17, wherein the control elements of the electrically sensitive unit include a Wheatstone bridge and two oppositely disposed induction coils connected therewith, and wherein the critical position of said armature is midway between said coils.

19. In a machine for grinding a succession of similar longitudinal workpieces to a predetermined diameter, the combination of a base, means on said base for holding each workpiece and for rotating it about a fixed longitudinal axis, a transversely movable support on said base for a grinding wheel rotatable about a generally longitudinal axis and having a peripheral grinding face, electrically driven operating mechanism for moving said wheel support forwardly so as to feed said wheel to a forward grinding position and for subsequently moving said support rearwardly to a normally fixed rearward position, said operating mechanism including a control member movable in one direction during forward feeding of the support and reversely movable during rearward movement of the support, a wheel dressing device bodily adjustable into engagement with the peripheral grinding face of the wheel, a compensation member normally movable in unison with said wheel support but adjustable transversely relatively thereto, a common means for adjusting the dressing device toward the wheel to the extent necessary to dress said wheel with a resultant reduction in wheel radius and for simultaneously adjusting the compensation member rearwardly relatively to said wheel support and relatively to said control member to an extent equal to said adjustment of said dressing device resulting in said reduction in wheel radius, a feed limiting means dependent upon forward movement of said compensation member relatively to said control member and including electrical parts which interrupt the electrical power supplied to said operating mechanism during forward movement of the support to thereby interrupt said forward movement when the support is in such position that the wheel grinds the corresponding workpiece to said predetermined diameter, a switch for interrupting the electrical power supplied to said operating mechanism during rearward movement of the support, and means on said control member for operating said switch to stop said support in said normally fixed rearward position.

20. A machine as set forth in claim 19, wherein mechanism is provided for effecting relative adjustment between the wheel support and the operating mechanism so as to forwardly adjust said normally fixed rearward position of said support, and wherein the last said adjusting mechanism is connected for operation in unison with said common means for adjusting the wheel dressing device and the compensation member so that said rearward position of the wheel support is adjusted forwardly to the same extent that said compensation member is adjusted rearwardly.

21. In a machine for grinding a succession of similar longitudinal workpieces to a predetermined diameter, the combination of a base, means on said base for holding each workpiece and for rotating it about a fixed longitudinal axis, a transversely movable support on said base for a grinding wheel rotatable about a generally longitudinal axis, electrically driven operating mechanism for moving said wheel support forwardly so as to feed said wheel to forward grinding positions and for subsequently moving said support rearwardly, a first means for initiating the action of said operating mechanism to feed said support and wheel forwardly, a first feed limiting means for interrupting the first forward movement of the wheel support by said operating mechanism when said support is in such position that the wheel grinds the corresponding workpiece to a diameter slightly greater than said predetermined diameter, a second means for again initiating the action of said operating mechanism to additionally feed said support and wheel forwardly, and a second feed limiting means which includes a relay switch for interrupting the electrical power supplied to said operating mechanism and also includes two cooperating elements one in normally fixed relationship with said base and the other in normally fixed relationship with said wheel support, one of said elements being an abutment and the other of said elements being an electrically sensitive unit comprising electrical control elements connected with said relay switch and also including an armature movable relatively to said control elements and engageable with said abutment upon forward movement of said wheel support so that the armature upon engagement with said abutment and upon relative movement thereby to a predetermined critical position causes said control elements to effect the operation of said switch when said wheel support is in such position that the wheel grinds the workpiece to the said predetermined diameter.

22. A machine as set forth in claim 21, wherein the means for holding and rotating said workpiece serves also to longitudinally reciprocate said workpiece so that it makes oppositely directed first and second passes in relation to the grinding wheel, wherein the first means for initiating the action of the operating mechanism and the first feed limiting means are timed to operate prior to said first longitudinal pass, and wherein the second means for initiating the action of the operating mechanism and the second feed limiting means are timed to operate after the first longitudinal pass of the work and prior to the second longitudinal pass of the work.

23. A machine as set forth in claim 21, wherein the grinding wheel is rotatable about a generally longitudinal axis, wherein there is provided a wheel dressing device bodily adjustable into engagement with the peripheral grinding face of the wheel, wherein there is provided a compensation member normally movable in unison with said wheel support but adjustable transversely relatively thereto, wherein there is provided a common means for adjusting the dressing device toward the wheel to the extent necessary to dress said wheel with a resultant reduction in wheel radius and for simultaneously adjusting the compensation member rearwardly relatively to said wheel support to an extent equal to said adjustment of said dressing device resulting in said reduction in wheel radius, and wherein one of said cooperating elements of said second feed limiting means is in fixed relationship with said adjustable compensation member.

24. A machine as set forth in claim 23, wherein the means for holding and rotating said workpiece serves also to longitudinally reciprocate said workpiece so that it makes oppositely directed first and second passes in relation to the grinding wheel, wherein the first means for initiating the action of the operating mechanism and the first feed limiting means are timed to operate prior to said first longitudinal pass, and wherein the second means for initiating the action of the operating mechanism and the second feed limiting means are timed to operate after the first longitudinal pass of the work and prior to the second longitudinal pass of the work.

25. In a machine for grinding a succession of similar longitudinal workpieces to a predetermined diameter, the combination of a base, means on said base for holding each workpiece and for rotating it about a fixed longitudinal axis, a transversely movable slide on said base for a grinding wheel rotatable about a generally longitudinal axis and having a peripheral grinding face, operating mechanism for moving said wheel slide forwardly so as to feed said wheel to a forward grinding position and for subsequently moving said slide rearwardly to a normally fixed rearward position, a wheel dressing device bodily adjustable into engagement with the peripheral grinding face of the wheel, a compensation member normally movable in unison with said wheel slide but adjustable transversely relatively thereto, a common means for adjusting the dressing device toward the wheel to the extent necessary to dress said wheel with a resultant reduction in wheel radius and for simultaneously adjusting the compensation member rearwardly relatively to said wheel slide to an extent equal to said adjustment of said dressing device resulting in said reduction in wheel radius and for simultaneously effecting relative adjustment between the wheel slide and the operating mechanism therefor so as to forwardly adjust said normally fixed rearward position of the wheel slide to an extent equal to said reduction in wheel radius, means for causing operation of said operating means to feed the wheel slide and wheel forwardly, a first feed limiting means dependent upon said adjusted rearward position of the wheel slide for interrupting the forward movement of said slide when said slide is in such position that the wheel grinds the corresponding workpiece to a diameter slightly greater than said predetermined diameter, means for again causing operation of the operating mechanism to feed the wheel slide and wheel forwardly, and a second feed limiting means dependent upon forward movement of said compensation member for interrupting the second forward movement of the wheel slide when said support is in such position that the wheel grinds the corresponding workpiece to said predetermined diameter.

References Cited in the file of this patent

UNITED STATES PATENTS

| | | |
|---|---|---|
| 1,739,753 | Flanders | Dec. 17, 1929 |
| 2,087,662 | Bysshe et al. | July 20, 1937 |
| 2,388,066 | Markus | Oct. 30, 1945 |